(12) United States Patent
Ito

(10) Patent No.: US 11,594,027 B2
(45) Date of Patent: *Feb. 28, 2023

(54) IMAGE PROCESSING DEVICE, IMAGE PROCESSING METHOD, PROGRAM, AND RECORDING MEDIUM

(71) Applicant: FUJIFILM Corporation, Tokyo (JP)

(72) Inventor: Naoya Ito, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 121 days.

This patent is subject to a terminal disclaimer.

(21) Appl. No.: 17/348,640

(22) Filed: Jun. 15, 2021

(65) Prior Publication Data

US 2021/0312181 A1 Oct. 7, 2021

Related U.S. Application Data

(63) Continuation of application No. 16/564,152, filed on Sep. 9, 2019, now Pat. No. 11,068,717.

(30) Foreign Application Priority Data

Sep. 27, 2018 (JP) .............................. JP2018-181891

(51) Int. Cl.
*G06V 20/00* (2022.01)
*G06K 9/62* (2022.01)
(Continued)

(52) U.S. Cl.
CPC ............. *G06V 20/35* (2022.01); *G06K 9/623* (2013.01); *G06T 7/194* (2017.01); *G06V 10/44* (2022.01); *G06T 2207/30242* (2013.01)

(58) Field of Classification Search
CPC ...... G06V 20/35; G06V 10/44; G06V 10/771; G06K 9/623; G06T 7/194; G06T 2207/30242

(Continued)

(56) References Cited

U.S. PATENT DOCUMENTS 7,310,174 B2 * 12/2007 Wine .................. G02B 26/105
359/201.1
7,593,834 B2 9/2009 Levitan et al.
(Continued)

FOREIGN PATENT DOCUMENTS

CN 101441535 A * 5/2009 ......... G06F 3/03545
CN 103502986 A * 1/2014 ............. G06F 16/58
(Continued)

OTHER PUBLICATIONS

Eriko Shibamoto et al.; "The examination of a tourist resort recommendation system based on photography and browsing behaviors"; Information processing society of Japan symposium series (CD-ROM); Jun. 21, 2017; pp. 494-499; vol. 2017; No. 1; Information Processing Society of Japan.
(Continued)

*Primary Examiner* — Mahendra R Patel
(74) *Attorney, Agent, or Firm* — Studebaker & Brackett PC

(57) ABSTRACT

In the image processing device, the image processing method, the program, and the recording medium according to an embodiment of the present invention, a processor connected to a memory, the processor configured to receive an input of an image set owned by a user, analyze each image included in the image set, determine a plurality of tag information of an imaging content in the image set based on an analyzing result of each image, set one or more objectives to be achieved by the user based on the plurality of tag information, and set one or more items to be executed by the user for each of the one or more objectives based on the analyzing result of each image, and perform control such that at least one of the one or more objectives or the one or more items is displayed on a display.

24 Claims, 10 Drawing Sheets

(51) Int. Cl.
*G06T 7/194* (2017.01)
*G06V 10/44* (2022.01)

(58) Field of Classification Search
USPC .......................................................... 382/224
See application file for complete search history.

(56) References Cited

U.S. PATENT DOCUMENTS

| | | | |
|---|---|---|---|
| 7,787,678 B2* | 8/2010 | Unai | G06T 7/149 |
| | | | 703/2 |
| 8,823,637 B2 | 9/2014 | Iwase et al. | |
| 9,715,542 B2* | 7/2017 | Lu | G06F 16/951 |
| 10,061,984 B2* | 8/2018 | Balasundaram | G06T 5/40 |
| 10,225,511 B1* | 3/2019 | Lim | G06K 9/6201 |
| 10,678,851 B2* | 6/2020 | Tcherechansky | H04N 5/23219 |
| 10,732,809 B2* | 8/2020 | Bialynicka-Birula | |
| | | | H04N 5/23219 |
| 10,825,567 B1* | 11/2020 | Wala | G06T 11/60 |
| | | | 382/190 |
| 2003/0063194 A1 | 4/2003 | Nishiyama et al. | |
| 2006/0248203 A1 | 11/2006 | Yamaoka et al. | |
| 2008/0313112 A1 | 12/2008 | Vapnik et al. | |
| 2009/0164894 A1* | 6/2009 | Takekawa | H04N 1/00466 |
| | | | 715/274 |
| 2010/0149132 A1* | 6/2010 | Iwase | G06F 1/1694 |
| | | | 345/175 |
| 2011/0157218 A1* | 6/2011 | Ptucha | G06T 11/60 |
| | | | 345/619 |
| 2011/0293238 A1* | 12/2011 | Kawashima | G11B 27/10 |
| | | | 386/E5.028 |
| 2013/0135464 A1* | 5/2013 | Kuroki | G06T 7/20 |
| | | | 348/135 |
| 2014/0003716 A1* | 1/2014 | Fedorovskaya | G06V 20/30 |
| | | | 382/218 |
| 2014/0273194 A1* | 9/2014 | Handique | G02B 21/06 |
| | | | 250/216 |
| 2015/0086116 A1* | 3/2015 | Yamaji | G06T 11/60 |
| | | | 382/190 |
| 2016/0331224 A1* | 11/2016 | Uji | A61B 3/0025 |
| 2016/0332071 A1* | 11/2016 | Hirata | A63F 13/98 |
| 2017/0032214 A1* | 2/2017 | Krenzer | G06V 10/48 |
| 2017/0100101 A1 | 4/2017 | Ryoo et al. | |
| 2018/0144214 A1* | 5/2018 | Hsieh | G06N 3/08 |
| 2019/0012796 A1 | 1/2019 | Yamasaki et al. | |

FOREIGN PATENT DOCUMENTS

| | | | |
|---|---|---|---|
| JP | H05-307645 A | 11/1993 | |
| JP | 2003-110792 A | 4/2003 | |
| JP | 2004-221869 A | 8/2004 | |
| JP | 2007-306259 A | 11/2007 | |
| JP | 2009027367 A * | 2/2009 | ......... G06F 3/03545 |
| JP | 2009-278161 A | 11/2009 | |
| JP | 2010-045436 A | 2/2010 | |
| JP | 2011-024138 A | 2/2011 | |
| JP | 2011257868 A | 12/2011 | |
| JP | 2012-094979 A | 5/2012 | |
| JP | 2013-012959 A | 1/2013 | |
| JP | 2013-021473 A | 1/2013 | |
| JP | 2013-115624 A | 6/2013 | |
| JP | 2013-210795 A | 10/2013 | |
| JP | 2015220652 A * | 12/2015 | ......... G06F 17/3025 |
| JP | 2016053941 A | 4/2016 | |
| JP | 5936658 B2 | 6/2016 | |
| JP | 2016200969 A * | 12/2016 | ......... H04N 21/4223 |
| JP | 6124677 B2 | 5/2017 | |
| JP | 6431231 B1 * | 11/2018 | ........... G06K 9/6262 |
| WO | WO-2014004062 A1 * | 1/2014 | ....... G06F 17/30247 |
| WO | WO-2014193093 A1 * | 12/2014 | ......... H04N 21/4223 |
| WO | WO-2017147580 A1 * | 8/2017 | ........... G06F 16/951 |

OTHER PUBLICATIONS

An Office Action; "Notice of Reasons for Refusal," mailed by the Japanese Patent Office dated Dec. 7, 2021, which corresponds to Japanese Patent Application No. 2018-181891 and is related to U.S. Appl. No. 17/348,640 with English translation.

* cited by examiner

IMAGE PROCESSING DEVICE, IMAGE PROCESSING METHOD, PROGRAM, AND RECORDING MEDIUM

CROSS-REFERENCE TO RELATED APPLICATIONS

The present application claims priority under 35 U.S.C. § 119 to Japanese Patent Application No. 2018-181891, filed on Sep. 27, 2018. The present application is continuation of U.S. application Ser. No. 16/564,152 filed Sep. 9, 2019. The above application(s) is hereby expressly incorporated by reference, in its entirety, into the present application.

BACKGROUND OF THE INVENTION

1. Field of the Invention

The present invention relates to an image processing device, an image processing method, a program, and a recording medium that suggests an objective to be achieved by a user.

2. Description of the Related Art

Generally popular contents and contents that may be interest to a user who uses a social networking service (SNS) are displayed by the SNS.

Here, the related arts related to the present invention include JP2011-257868A, JP6124677B, JP5936658B, and JP2016-053941A.

JP2011-257868A describes an image server that analyzes image data received from a terminal device of a user, extracts preference information related to preference of the user, selects relevant information related to the preference information of the user from a database, and transmits the selected relevant information to the terminal device of the user.

JP6124677B describes an information providing device that generates characteristic information indicating characteristics of a user based on first image data obtained from a communication terminal of a user, generates situation information indicating a situation of the user based on second image data obtained from the communication terminal of the user, selects a first content from a plurality of contents based on the characteristic information and the situation information, and outputs information indicating the selected content.

JP5936658B describes that a recommended combination image is created by using a template corresponding to a theme by performing image obtainment, image analysis, and theme determination and the created recommended combination image is suggested to a user.

JP2016-053941A describes that an administrator registers preference information of a member based on behavior information of the member extracted from photograph information and sends guidance information of a product or a service to the member including the preference information corresponding to the input preference information.

SUMMARY OF THE INVENTION

However, there is a problem that it is difficult to suggest, as the content, an objective that is actually of interest to the user. JP2011-257868A discloses that the preference of the user is extracted and a reference for requesting permission to transmit the extracted preference to another user, but does not discloses other purposes of use. JP6124677B discloses that information indicating the content is output based on the image and the content mentioned herein indicates preference such as "I like dogs" a situation of "I am with a dog". However, JP6124677B does not disclose that the objective is suggested. JP5936658B discloses that the template is selected according to the theme determination, but does not disclose that the objective is suggested. JP2016-053941A discloses that the guidance information of the product or the service based on the photograph information and the administrator presents theme and mission related to a photograph to be captured by the member to the member, but does not disclose that the theme and mission are suggested based on the photograph information. Accordingly, an object of the present invention is to an image processing device, an image processing method, a program, and a recording medium which are capable of suggesting an objective of interest to a user.

In order to achieve the object, the present invention provides an image processing device comprising an image receiving unit that receives an input of an image set owned by a user, an image analyzing unit that analyzes each image included in the image set, a tendency determining unit that determines a tendency of an imaging content in the image set based on an analyzing result of each image, an objective setting unit that sets one or more objectives to be achieved by the user based on the tendency of the imaging content, and sets one or more items to be executed by the user based on the analyzing result of each image for each of the one or more objectives, and a display controller that performs control such that at least one of the one or more objectives or the one or more items is displayed on a display.

In this case, in a case where a first objective is selected from the one or more objectives, it is preferable that the display controller displays executed items which have been executed by the user and execution candidate items which have not been executed by the user, among one or more items set for the first objective.

It is preferable that the image processing device further comprises an execution determining unit that determines whether or not the user has executed the execution candidate items. It is preferable that the execution determining unit confirms that an image captured by the user is captured in a location of a first execution candidate item based on information of an imaging location assigned to the image captured by the user in a case where the first execution candidate item is selected from the execution candidate items and the image captured by the user is input, and determines that the user has executed the first execution candidate item in a case where it is confirmed that the user checks in the location of the first execution candidate item.

It is preferable that the objective setting unit sets the one or more objectives from a plurality of objectives prepared in advance.

It is preferable that the objective setting unit sets one or more items to be executed by the user based on the analyzing result of each image for each of the plurality of objectives. It is preferable that the image processing device further comprises an item number determining unit that confirms the number of executed items executed by the user among the one or more items set for the objective for each objective whenever the new image or image set is added to the image set owned by the user, and determines whether or not the number of executed items reaches a threshold value of the objective, in a case where the image receiving unit receives an input of a new image or image set owned by the user and adds the received new image or image set to the image set owned by the user. It is preferable that the objective setting unit sets, as the one or more objectives, the objective of which the number of executed items reaches the threshold value among the plurality of objectives.

It is preferable that the objective setting unit sets the one or more objectives based on tendencies of imaging contents in image sets owned by a plurality of users who uses the image processing device.

It is preferable that the objective setting unit sets the one or more objectives based on a tendency of an imaging content in one or more images shared with other users who use the image processing device among the images included in the image set owned by the user.

It is preferable that the display controller sequentially displays the one or more objectives as a banner.

It is preferable that the display controller displays description of the objective, a degree of achievement of the objective, and a background image related to the objective for each of the one or more objectives.

It is preferable that the display controller displays, as the description of the objective, description of the executed item executed by the user among the one or more items set for the objective, and displays a degree of execution of the executed item as the degree of achievement of the objective.

It is preferable that the display controller displays, as the degree of execution of the executed item, the number of executed items or a ratio of the number of executed items to the number of items set for the objective.

It is preferable that the display controller displays, as the description of the objective, description of an execution candidate item which has not been executed by the user among the one or more items set for the objective, and displays, as the degree of achievement of the objective, a degree of execution of the execution candidate item.

It is preferable that the display controller displays, as the degree of execution of the execution candidate item, the number of execution candidate items or a ratio of the number of execution candidate items to the number of items set for the objective.

It is preferable that the objective setting unit excludes the objective which is displayed by a predetermined number of times and is not selected from the one or more objectives.

In a case where the image receiving unit receives an input of a new image or image set owned by the user and adds the new image or image set to the image set owned by the user and the new image or image set is an image captured in a location of any item set for the objective excluded from the one or more objectives, it is preferable that the objective setting unit sets, as the one or more objectives, the objective excluded from the one or more objectives.

It is preferable that the tendency determining unit determines a tendency of an imaging content in an image group selected from the image set.

It is preferable that the objective setting unit ranks the objective according to the degree of achievement of the objective for each of the one or more objectives.

It is preferable that the display controller displays a list of objectives being challenged by the user and a list of objectives achieved by the user.

The present invention provides an image processing method comprising receiving, by an image receiving unit, an input of an image set owned by a user, analyzing, by an image analyzing unit, each image included in the image set, determining, by a tendency determining unit, a tendency of an imaging content in the image set based on an analyzing result of each image, setting, by an objective setting unit, one or more objectives to be achieved by the user based on the tendency of the imaging content, and setting one or more items to be executed by the user for each of the one or more objectives based on the analyzing result of each image; and performing, by a display controller, control such that at least one of the one or more objectives or the one or more items is displayed on a display.

In a case where a first objective is selected from the one or more objectives, it is preferable that executed items which have been executed by the user and execution candidate items which have not been executed by the user among the one or more items set for the first objective are displayed.

It is preferable that the image processing device further comprises determining, by an execution determining unit, whether or not the user has executed the execution candidate item. It is preferable that it is confirmed that an image captured by the user is captured in a location of a first execution candidate item based on information of an imaging location assigned to the image captured by the user in a case where the first execution candidate item is selected from the execution candidate items and the image captured by the user is input, and it is determined that the user has executed the first execution candidate item in a case where it is confirmed that the user checks in the location of the first execution candidate item.

The present invention provides a program causing a computer to execute the steps of any of the image processing methods.

The present invention provides a computer-readable recording medium having a program causing a computer to execute the steps of any of the image processing methods recorded thereon.

The present invention provides an image processing device comprising an image receiving unit that receives an input of an image set owned by a user, an image analyzing unit that analyzes each image included in the image set, a tendency determining unit that determines a tendency of an imaging content in the image set based on an analyzing result of each image, an objective setting unit that sets one or more objectives to be achieved by the user based on the tendency of the imaging content, and sets one or more items to be executed by the user for each of the one or more objectives based on the analyzing result of each image, and a display controller that performs control such that at least one of the one or more objectives or the one or more items is displayed on a display. The image receiving unit, the image analyzing unit, the tendency determining unit, the objective setting unit, and the display controller are constituted by dedicated hardware or processors that execute programs.

It is preferable that the image processing device further comprises an execution determining unit that determines whether or not the user has executed the execution candidate items. It is preferable that the execution determining unit is constituted by dedicated hardware or a processor that executes a program. It is preferable that the execution determining unit confirms that an image captured by the user is captured in a location of a first execution candidate item based on information of an imaging location assigned to the image captured by the user in a case where the first execution candidate item is selected from the execution candidate items and the image captured by the user is input, and determines that the user has executed the first execution candidate item in a case where it is confirmed that the user checks in the location of the first execution candidate item.

It is preferable that the objective setting unit sets one or more items to be executed by the user based on the analyzing result of each image for each of the plurality of objectives.

It is preferable that the image processing device further comprises an item number determining unit that confirms the number of executed items executed by the user among the one or more items set for the objective for each objective whenever the new image or image set is added to the image set owned by the user, and determines whether or not the number of executed items reaches a threshold value of the objective, in a case where the image receiving unit receives an input of a new image or image set owned by the user and adds the received new image or image set to the image set owned by the user. It is preferable that the item number determining unit is constituted by dedicated hardware or a processor that executes a program. It is preferable that the objective setting unit sets, as the one or more objectives, the objective of which the number of executed items reaches the threshold value among the plurality of objectives.

According to the present invention, it is possible to suggest the objective and the item of interest to the user to the user by setting the objective to be achieved by the user based on the tendency of the imaging content in the image set owned by the user, setting the item to be executed by the user based on the analyzing result of each image, and displaying the set objective and the set item on the display. Accordingly, it is possible to provide a good opportunity to capture a new photo to the user.

DESCRIPTION OF THE PREFERRED EMBODIMENTS

Hereinafter, an image processing device, an image processing method, a program, and a recording medium according to an embodiment of the present invention will be described in detail based on preferred embodiments shown in the accompanying drawings.

Figure 1:
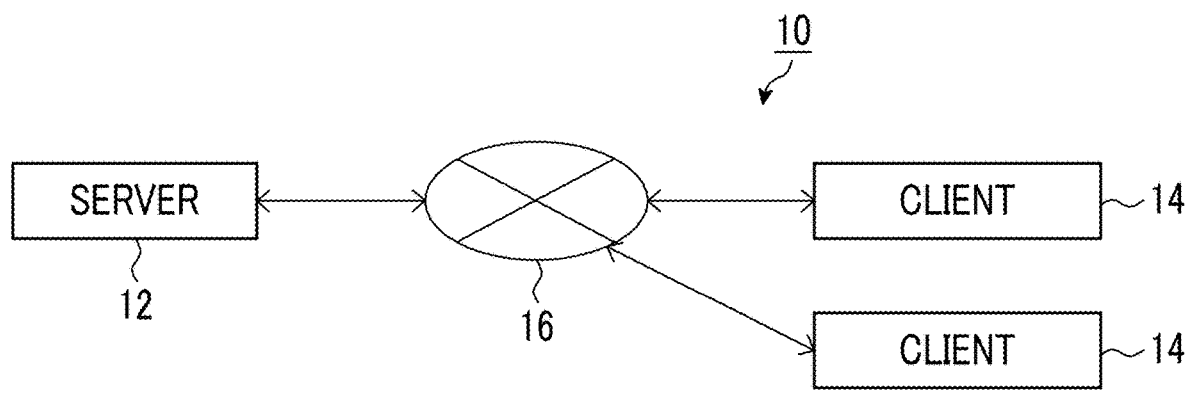
FIG. 1 is a block diagram of an embodiment showing a configuration of an image processing system according to an embodiment of the present invention.

FIG. 1 is a block diagram of an embodiment showing a configuration of an image processing system according to the embodiment of the present invention. An image processing system 10 shown in FIG. 1 comprises a server 12, and a plurality of clients 14 connected to the server 12 via a network 16.

The server 12 has a function of obtaining image sets owned by a plurality of users who uses the image processing system 10 and setting each image included in the image set owned by each of the plurality of users so as to publish each image to any user, so as to publish each image to only a sharing partner, or so as not to publish each image to the public. The number of servers 12 is not limited to one, but a plurality of servers may be used. The server is a workstation including a control device, a storage device, and a communication device.

The client 14 is the image processing device of the present embodiment, and has a function of setting an objective (a theme or a mission) to be achieved by the user which includes a plurality of items to be executed by the user and suggesting the set objective to the user. The client 14 is a desktop personal computer (PC), a laptop PC, a tablet PC, or a portable terminal such as a portable phone and a smartphone that includes a control device, an input device, a storage device, a communication device, and a display.

Figure 2:
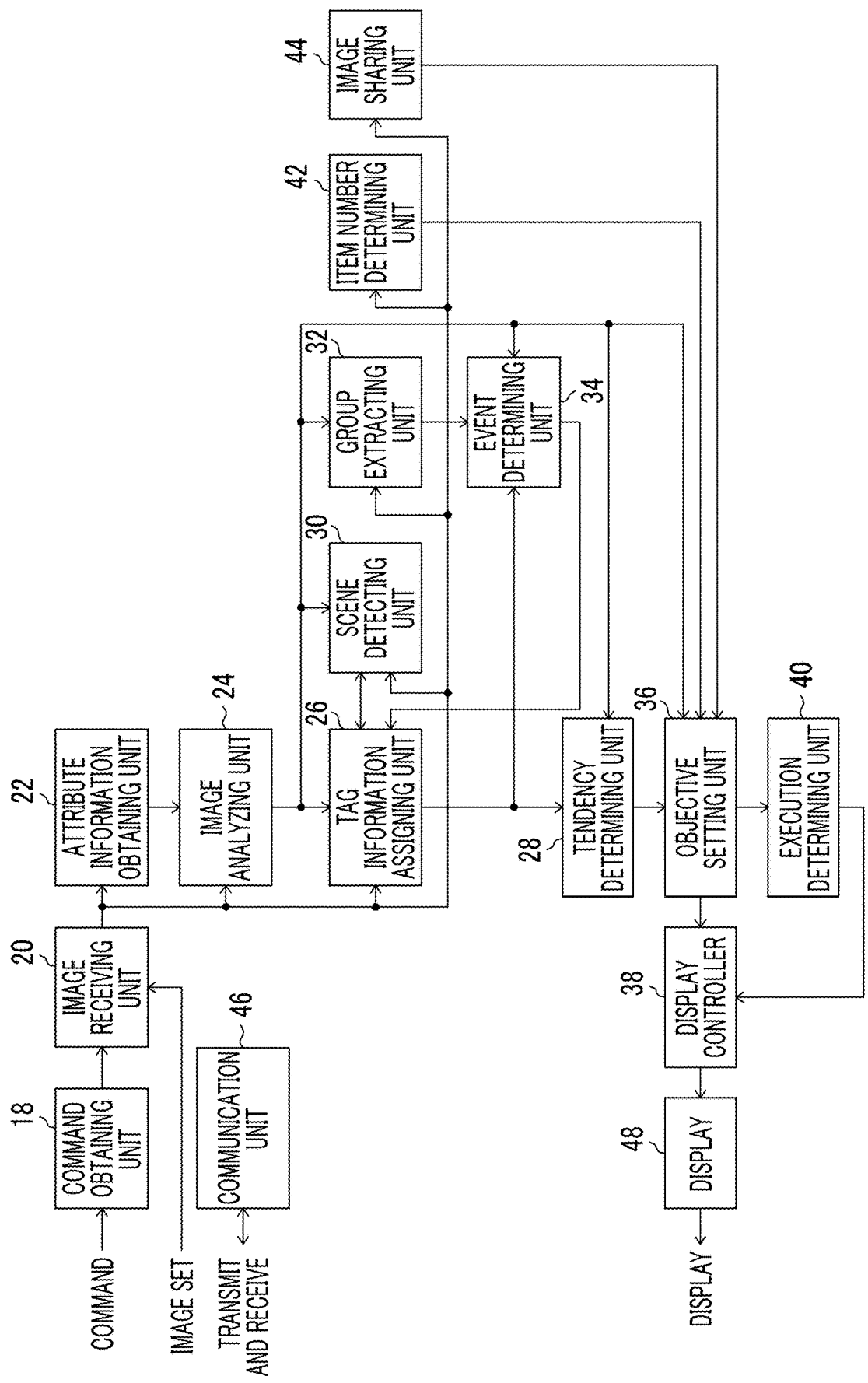
FIG. 2 is a block diagram of an embodiment showing a configuration of a client.

FIG. 2 is a block diagram of an embodiment showing a configuration of the client. The client 14 shown in FIG. 2 comprises a command obtaining unit 18, an image receiving unit 20, an attribute information obtaining unit 22, an image analyzing unit 24, a tag information assigning unit 26, a tendency determining unit 28, a scene detecting unit 30, a group extracting unit 32, an event determining unit 34, an objective setting unit 36, a display controller 38, an execution determining unit 40, an item number determining unit 42, an image sharing unit 44, a communication unit 46, and a display 48.

Hereinafter, the client 14 owned by a first user will be described. The first user is any one user (a user of the present invention) of all users who use the image processing system 10. In the present embodiment, although the client 14 of the first user will be described, the client 14 owned by another user other than the first user has the same configuration and function.

In the client 14 of the first user, the command obtaining unit 18 initially obtains various commands input from the first user by using an input device such as a keyboard, a mouse, or a touch panel.

The first user inputs a command by using the input device while viewing a screen displayed on the display 48. The command input by the first user is not particularly limited, but the command includes a command to designate the image set, a command to select an objective, a command to select an item, a command to capture an image, a command to display a list of objectives, a command to select an image from the image set, a command to set a sharing partner of the image, and a command to set the image so as to publish the image to the public, so as to share the image, or so as not to publish the image to the public.

Subsequently, the image receiving unit 20 receives an input of the image set owned by the first user according to the command to designate the image set. In other words, the image receiving unit 20 obtains the image group owned by the first user. In a case where a new image or image set owned by the first user is input, the image receiving unit 20 receives an input of the new image or image set, and adds the received image or image set as the image set owned by the first user.

The image set owned by the first user is not particularly limited, but an image set stored in the storage device of the client 14 of the first user, an image set recorded in an external recording medium such as a universal serial bus (USB) memory, a secure digital (SD) memory, a compact disc (CD), a digital versatile disc (DVD), and a hard disk (HD), an image set stored in an online storage, and an image set posted to an SNS are included in the image set. The image includes a still image and a motion picture.

Subsequently, the attribute information obtaining unit 22 obtains attribute information assigned to each image included in the image set from each image.

The attribute information can be assigned to each of the plurality of images included in the image set. The attribute information is information indicating an attribute of the image. For example, exchangeable image file format (Exif) information can be used as an example of the attribute information. The Exif information is information regarding an imaging condition of the image, and includes, for example, information such as an imaging date and time of the image, an imaging location (positional information), a focal length, or exposure. The Exif information is assigned as header information of the image (image data) captured by a digital camera.

Subsequently, the image analyzing unit 24 analyzes each image included in the image set.

The image analysis is not particularly limited, but includes brightness determination, color evaluation, blur evaluation, analysis of the attribute information obtained by the attribute information obtaining unit 22, and subject recognition for recognizing subjects (persons and objects other than the persons) appearing in the image. The subject recognition includes face detection, person recognition (face recognition), and object recognition (meat, fruit, flower, or cake).

Subsequently, the tag information assigning unit 26 assigns tag information to the image based on the analyzing result of the image for each image included in the image set.

In the case of the present embodiment, the tag information assigning unit 26 assigns the tag information related to at least one of the attribute information of the image analyzed by the image analyzing unit 24 or the subject appearing in the image to the image for each image included in the image set.

The tag information is a name indicating the attribute information of the image, the subject appearing in the image, and an emotion read from the image. For example, in a case where an imaging year of the image is 2018, the tag information of "2018" is assigned to the image. In a case where the imaging location of the image is Tokyo, the tag information of "Tokyo" is assigned to the image. In a case where "meat" and a plurality of "persons" appear as the subjects in the image, the tag information items of "meat", "person", "get-together", and "girl-only gathering" are assigned to the image. In a case where "person" appearing in the image has a smile, the tag information items of "smile" and "enjoy" are assigned to the image. The emotion can be measured by measuring and detecting a heart rate, a respiration rate, a blood pressure, an electrocardiogram, a body temperature, and sweating by a wearable terminal, and by measuring and detecting a degree of opening of the pupil by a goggle type terminal.

The tag information assigning unit 26 can assign, as the tag information, scene tag information related to a scene of the image to the image for each image included in the image set.

The scene tag information is a name indicating the scene of the image. The scene indicates one scene such as "children", "sky", "sea", "school", or "sports day" at a point of time when one image is captured. For example, in a case where "precincts", "Japanese clothing", and "children" appear in the image, the scene tag information of "celebration of child's third, fifth, and seventh years of age" is assigned to the image.

The tag information assigning unit 26 can assign, as the tag information, event tag information related to an event to the event and each image captured in the event for each event occurring in the image group extracted from the image set.

The event tag information is a name indicating the event. The event indicates an event such as "entrance ceremony", "sports day", and "travel" occurring over a period for which the image group is captured. For example, in the image group captured for multiple days in succession, in a case where "landscape" and "cooking" appear, or in a case where "landmark" and "imaging location different from usual imaging" appear, the event tag information of "travel" is assigned to the event and each image captured in the event included in the image group.

The tag information, the scene tag information, and the event tag information can be manually assigned to the image by the first user. The tag information assigning unit 26 can use the tag information, the scene tag information, and the event tag information already assigned to the image without assigning the tag information, the scene tag information, and the event tag information to the image. At least two or more information items such as "children" and "sports day" of the tag information, the scene tag information, and the event tag information may be expressed by the same name.

Subsequently, the tendency determining unit 28 determines a tendency of an imaging content in the image set based on an analyzing result of each image.

In a case where many images in which "mountain" appears are included as the subject in the image set, it can be seen that a tendency of the imaging content in the image set, that is, the content that may be of interest to the first user is "mountain". Alternatively, in a case where many images in which "ramen" appears are included as the subject in the image set, it can be seen that the tendency of the imaging content in the image set is "ramen".

However, even in a case where many images in which "mountain" appears are included as the subject in the image set, the content that may be of interest to the first user may be "insect" and "plant" present in "mountain". In this case, since many images in which "insects" and "plants" appear are supposed to be included in the image set, it can be seen that the content that may be of interest to the first user is not "mountain" but "insect" and "plant".

The tendency of the imaging content is not limited to a content capable of being directly determined from the subject, but may indicate a hobby, interest, and preference of the first user such as "travel". In the case of the present embodiment, the tendency determining unit 28 determines, as the tendency of the imaging content, the hobby of the first user based on the attribute information analyzed by the image analyzing unit 24 and the tag information assigned from the analyzing result of each image.

For example, the method of determining the hobby of the imaging content, that is, the hobby of the first user is not particularly limited, but the tendency determining unit 28 can determine the hobby of the first user based on the number of times of appearances of the tag information for each kind of the tag information assigned to the image included in the image set.

In this case, the tendency determining unit 28 counts the number of times of appearances of the tag information by using the number of imaging days of the images, to which the tag information is assigned, for each kind of the tag information, and determines that the first user has a hobby related to the tag information for which a ratio of the number of times of appearances of the tag information counted by using the number of imaging days to the total number of times of appearances of all kinds of tag information items assigned to the images included in the image set is equal to or greater than a threshold value, or counts the number of times of appearances of the tag information by using the number of the images, to which the tag information is assigned, for each kind of the tag information, and determines that the first user has a hobby related to the tag information for which the number of times of appearances of the tag information counted by using the number of images is equal to or greater than the threshold value.

The tendency determining unit 28 can count the number of times of appearances of the scene tag information by using the number of imaging days of the images, to which the scene tag information is assigned, for each kind of the scene tag information, and can determine that the first user has a hobby related to the scene tag information for which a ratio of the number of times of appearances of the scene tag information counted by using the number of imaging days to the total number of times of appearances of all kinds of the scene tag information items assigned to the images included in the image set is equal to or greater than a threshold value, or can count the number of times of appearances of the scene tag information by using the number of the images, to which the scene tag information is assigned, for each kind of the scene tag information, and can determine that the first user has a hobby related to the scene tag information for which the number of times of appearances of the scene tag information counted by using the number of images is equal to or greater than the threshold value.

The tendency determining unit 28 can count the number of times of appearances of the event tag information by using the number of imaging days of the images, to which the event tag information is assigned, or the number of the events, to which the event tag information is assigned, for each kind of the event tag information, and can determine that the first user has a hobby related to the event tag information for which a ratio of the number of times of appearances of the event tag information counted by using the number of imaging days to the total number of times of appearances of all kinds of event tag information items assigned to the images included in the image set is equal to or greater than a threshold value, or can count the number of times of appearances of the event tag information by using the number of the images, to which the event tag information is assigned, for each kind of the event tag information, and can determine that the first user has a hobby related to the event tag information for which the number of times of appearances of the event tag information counted by using the number of images is equal to or greater than the threshold value.

Subsequently, the scene detecting unit 30 detects the scene of the image based on the attribute information the tag information of the image for each image included in the image set.

The scene detecting unit 30 integrates all the attribute information items of the image and all the tag information items assigned to the image, and detects a high context scene for the entire image. The high context scene is a scene such as "celebration of child's third, fifth, and seventh years of age" and "travel" capable of being read from the entire image. In contrast to the high context scene, a scene such as "children" capable of being detected from the subject appearing in the image is referred to as a low context scene.

Subsequently, the group extracting unit 32 extracts the image group including two or more images from the image set based on the imaging date and time of each image.

The group extracting unit 32 extracts, as the same image group, a plurality of images of which imaging dates and times are close to each other, that is, two or more images of which an imaging interval is less than a threshold value from the image set.

Subsequently, the event determining unit 34 determines the event occurring in the image group based on the attribute information items and the tag information items of the images included in the image group for each image group extracted from the image set.

The event determining unit 34 integrates all the attribute information items of the images included in the image group and all the tag information items assigned to the images included in the image group, and detects the high context event for the image group.

Subsequently, the objective setting unit 36 sets one or more objectives to be achieved by the first user based on the tendency of the imaging content in the image set determined by the tendency determining unit 28. One or more items to be executed by the first user are set for each of one or more objectives based on the analyzing result of each image.

The first user selects a first objective from one or more objectives set by the objective setting unit 36, and achieves the first objective by executing all the items set for the first objective like a so-called stamp rally.

For example, in a case where many images in which "mountain" appears are included as the subject in the image set, the tendency of the imaging content in the image set is "mountain". That is, it can be seen that the first user has an interest in "mountain". The objective in this case is a list (may include the mountains that the first user have already climbed) of "mountains" that the first user is to climb, and the items set for the objective are individual "mountains" that the first user is to climb.

In this case, in a case where there is no single image in which "mountain" appears, even though it is suggested that the first user climbs the mountain that the first user has not climbed yet as the objective, it is considered that "mountain" is not a target of interest to the first user. In a case where there are many images in which "mountain" appears but there is no single image in which "mountain" appears, even though a list of "overseas mountains" is suggested as items, it is considered that "overseas mountains" are not targets of interest to the first user.

As stated above, in a case where the objective and the item which are not of interest to the first user are set, it is considered that the first user is very unlikely to challenge the objective. In contrast, since the objective setting unit 36 sets the objective of interest to the first user based on the tendency of the imaging content and sets the item of interest to the first user based on the analyzing result of each image, the first user can be more likely to challenge the objective.

The objective is not particularly limited as long as the objective is a matter of interest to the first user, but is preferably a list of matters that the user can reach and experience by actually moving. For example, "prefectures that you have not gone to", "top 20 famous ramen shops in Tokyo", "30 winter dating spots", and "beautiful places at night" can be used as examples. The objective may be determined in cooperation or partnership with various companies. For example, an objective of "station that you have not gone to" may be determined in cooperation with a railway company, or an objective of "100 selected hot springs in Japan" may be determined in cooperation with a travel company.

The item is not particularly limited as long as the objective is a matter of interest to the first user, but is preferably a list of matters that the user can reach and experience by actually moving. For example, a place, a store, and a sightseeing spot present within a range of a circle having a predetermined radius using the home of the first user as a center can be used as examples. A plurality of the list of matters to be the objective may be stored in advance in a storage device such as a hard disc dive (HDD) in the image processing system.

Subsequently, the display controller 38 performs control such that at least one of one or more items or one or more objectives set by the objective setting unit 36 is displayed on the display 48. The display controller 38 displays executed items which have been executed by the first user and execution candidate items which have not been executed by the first user among one or more items set for the first objective selected by the first user according to a command to select the objective from one or more objectives displayed on the display 48. The objective may be set without adding the already executed item to the objective, and in this case, one objective may be constituted by one item. However, in the present embodiment, the objective may be set by adding the already executed item. Accordingly, in the present embodiment, hereinafter, the description will be made on the assumption that one objective is constituted by two or more items.

Subsequently, the execution determining unit 40 determines whether or not the first user has executed the execution candidate item.

The method of determining, by the execution determining unit 40, whether or not the first user has executed the execution candidate item is not particularly limited. For example, a method of confirming a position of the first user such as a method of confirming that an image captured by the first user is captured at a location of the execution candidate item based on information of an imaging location assigned to the image captured by the first user, a method of confirming that the first user checks in the location of the execution candidate item, or a method of confirming both the aforementioned cases can be used as an example. The execution determining unit may determine that the first user has executed the execution candidate item by a declaration of the first user.

Subsequently, the item number determining unit 42 confirms the number of executed items executed by the first user among one or more items set for the objective for each objective whenever a new image or image set is added to the image set owned by the first user. The item number determining unit determines whether or not the number of executed items reaches a threshold of the objective.

Subsequently, the image sharing unit 44 shares images between the first user and a second user.

The second user is any one user or a plurality of users (other users in the present invention) other than the first user of all the users who use the image processing system 10. The image sharing unit 44 sets the image selected according to the command to select the image from the image set so as to publish the image to any user or so as not to publish the image to the public according to the command to set the image so as to publish the image or so as not to publish the image to the public. The image sharing unit 44 shares the image selected according to the command to select the image with only the sharing partner set according to the command to set the sharing partner according to the command to share the image.

Subsequently, the communication unit 46 is the communication device of the client 14, and transmits and receives various data items to and from the communication device of the server 12.

For example, the communication unit 46 uploads the image (image data) stored in the storage device of the client 14 to the server 12 from the client 14 via the network 16, and downloads the image stored in the storage device of the server 12 to the client 14 from the server 12 via the network 16.

Figure 3:
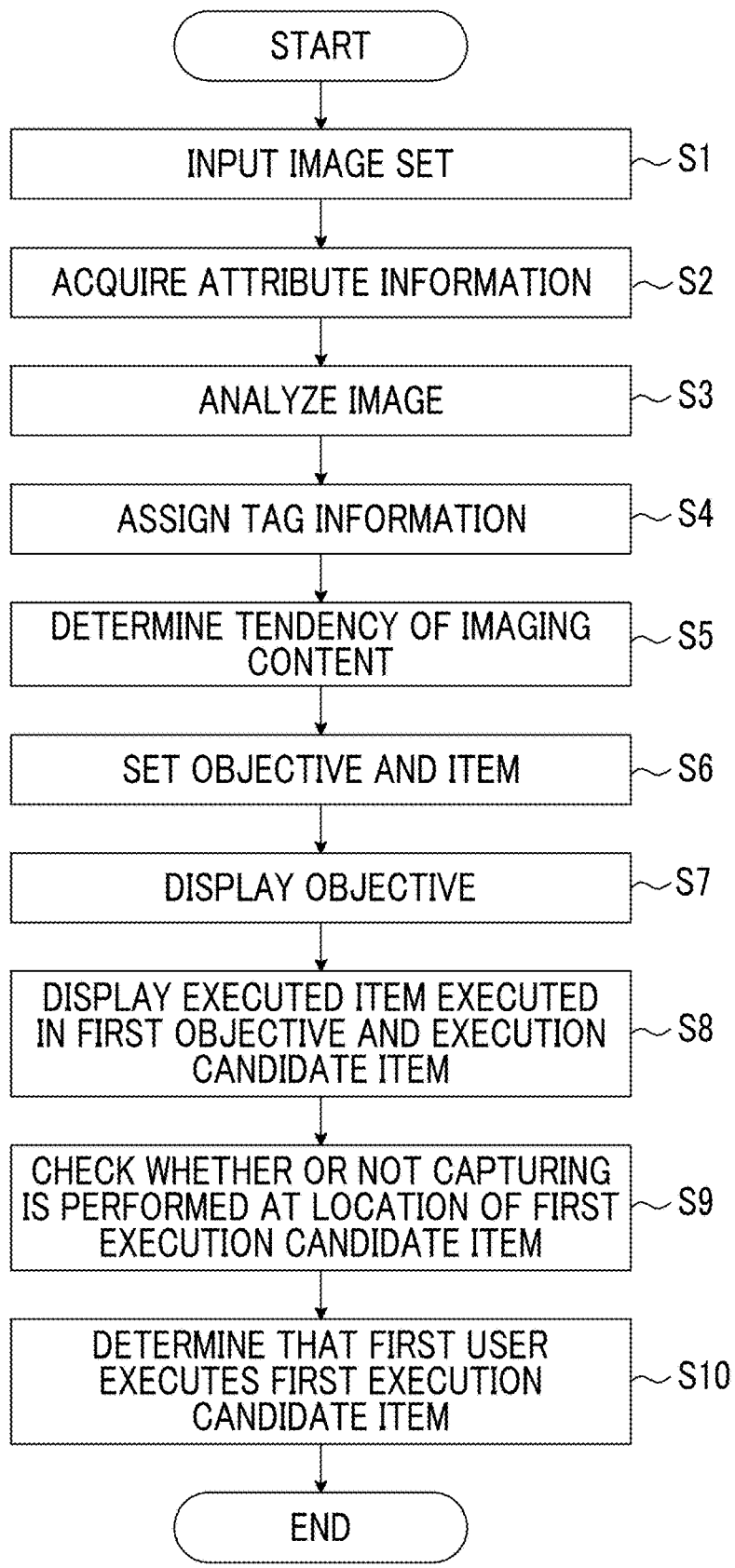
FIG. 3 is a flowchart of an embodiment showing an operation of the image processing system.

Next, an operation of the image processing system 10 will be described with reference to a flowchart shown in FIG. 3.

In the client 14 owned by the first user, the image receiving unit 20 initially receives an input of the image set owned by the first user according to the command to designate the image set (S1). The image set is stored in the storage device of the client 14. The image set is uploaded to the server 12 from the client 14 via the network 16, and are stored in the storage device of the server 12.

Subsequently, the attribute information obtaining unit 22 obtains the attribute information of each image included in the image set from each image (S2).

Subsequently, each image included in the image set is analyzed by the image analyzing unit 24 (S3).

Subsequently, the tag information assigning unit 26 assigns tag information to the image based on the attribute information of the image and the analyzing result of each image for each image included in the image set (S4).

Immediately after the input of the image set is received by the image receiving unit 20, the obtainment of the attribute information, the analysis of the image, and the assignment of the tag information may be performed. Alternatively, after the input of the image set is received by the image receiving unit 20, the obtainment of the attribute information, the analysis of the image, and the assignment of the tag information may be performed for a period for which any processing is not performed by the image processing system 10, for example, in the nighttime.

Subsequently, the tendency determining unit 28 determines the tendency of the imaging content in the image set based on the analyzing result of each image (S5).

Subsequently, the objective setting unit 36 sets one or more objectives to be achieved by the first user based on the tendency of the imaging content. One or more items to be executed by the first user are set for each of one or more objectives based on the analyzing result of each image (S6).

Subsequently, the display controller 38 performs control such that one or more objectives set by the objective setting unit 36 are displayed on the display 48 (S7). Accordingly, one or more objectives are suggested to the first user.

Subsequently, it is assumed that a first objective is selected from one or more objectives displayed on the display 48 according to the command to select the objective.

In this case, the executed items which have been executed by the first user and the execution candidate items which have not been executed by the first user among one or more items set for the first objective are displayed under the control of the display controller 38 (S8).

Subsequently, a first execution candidate item is selected from the execution candidate items according to the command to select the item.

In this case, the image is captured at the location of the first execution candidate item according to the command to capture the image. The information of the imaging location is automatically assigned to the captured image. The captured image is stored in the storage device of the client 14, and is input to the execution determining unit 40. The captured image is uploaded to the server 12 from the client 14 via the network 16, and is stored in the storage device of the server 12.

Subsequently, the execution determining unit 40 confirms whether or not the captured image is captured at the location of the first execution candidate item based on the information of the imaging location assigned to the captured image (S9). In a case where it is confirmed that the captured image is captured at the location of the first execution candidate item, the first user can check in the location of the first execution candidate item. Subsequently, the execution determining unit 40 confirms whether or not the first user checks in the location of the first execution candidate item, and determines that the first user has executed the first execution item in a case where it is confirmed that the first user checks in the location of the first execution candidate item (S10).

In a case where the first execution candidate item is selected from the execution candidate items and the image captured by the first user is input, the execution determining unit 40 confirms that the image captured by the first user is captured at the location of the first execution candidate item based on the information of the imaging location assigned to the image captured by the first user, and determines that the first user has executed the first execution candidate item in a case where it is confirmed that the first user checks in the location of the first execution candidate item.

In a case where the first objective is selected from one or more objectives, the first execution candidate item executed by the first user is displayed as the executed item under the control of the display controller 38.

Figure 4:
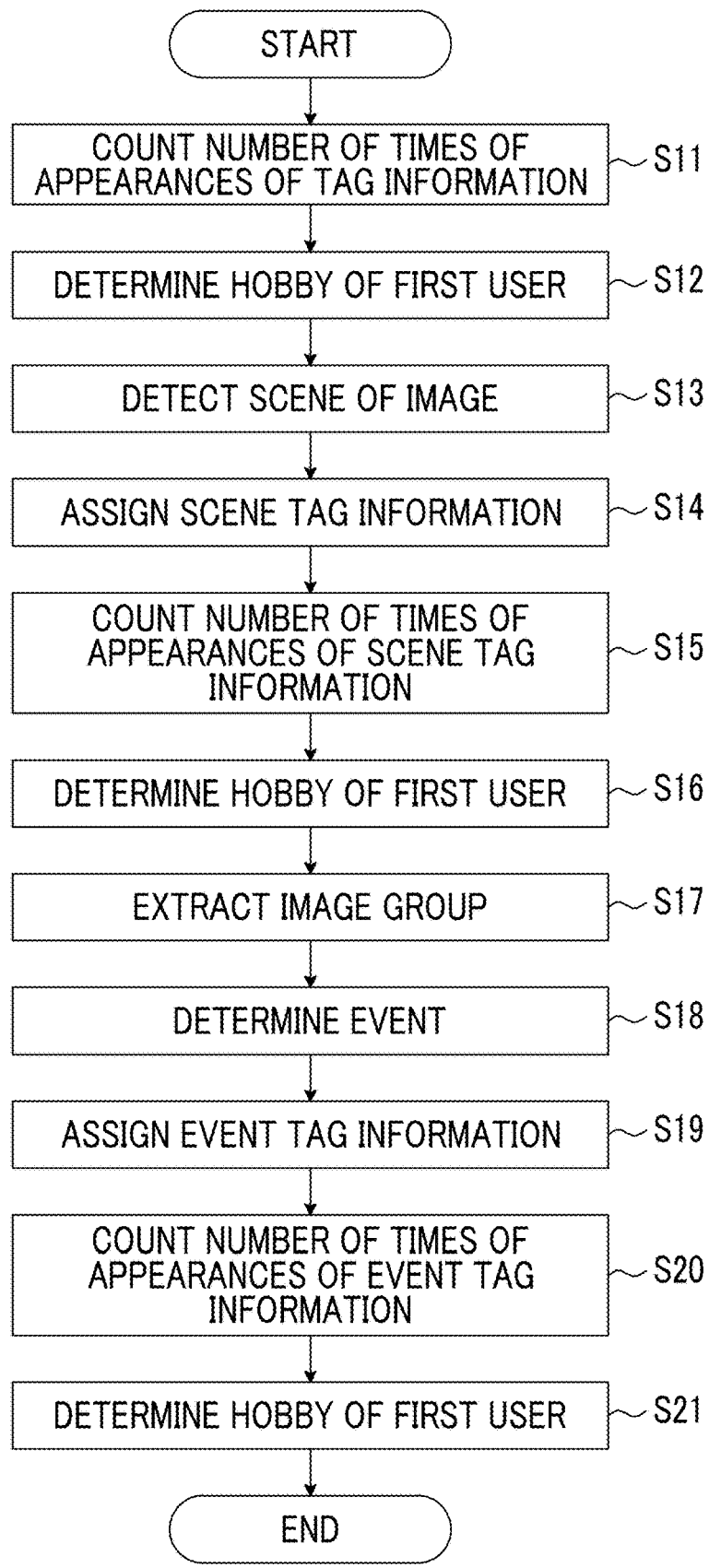
FIG. 4 is a flowchart of an embodiment showing an operation of the image processing system in a case where a tendency of an imaging content is determined.

Next, an operation of the image processing system 10 in a case where the tendency of the imaging content is determined will be described with reference to a flowchart shown in FIG. 4.

In the case of the present embodiment, the hobby of the first user is initially determined based on the tag information.

In this case, the tendency determining unit 28 counts the number of times of appearances of the tag information by using the number of imaging days of the images to which the tag information is assigned for each kind of the tag information (S11). Subsequently, the tendency determining unit 28 determines that the first user has the hobby related to the tag information of which the ratio of the number of times of appearances counted by using the number of imaging days to the total number of times of appearances of all the kinds of tag information items assigned to the images included in the image set is equal to or greater than a threshold value (S12).

In a case where the tendency such as gourmet, electric railways, alcohol labels, or manholes of the first user is directly seen on the subject appearing in the image, that, is, in a case where the hobby of the first user can be determined from only the tag information related to the subject, the tendency determining unit 28 determines that the first user has the hobby related to the tag information corresponding to the kind of which the number of times of appearances is relatively large among all the kinds of tag information items assigned to the images included in the image set owned by the first user.

For example, even though the image set is intensively captured for one day and the same kind of tag information items are assigned to many images included in the image set, the images to which these tag information items are assigned are not captured at all for the other day. That is, even though the images are intensively captured for one day and the same kind of tag information items are assigned to many images included in the image set, the first user may not necessarily have the hobby related to the tag information.

In general, the hobby is repeatedly and consistently performed. Accordingly, as in the present embodiment, it is possible to determine whether or not the hobby of the first user is the hobby performed repeatedly and consistently by counting the number of times of appearances of the tag information by using the number of imaging days of the images to which the tag information is assigned, and it is possible to accurately determine that the first user has the hobby related to the repeatedly and consistently seen tag information.

Alternatively, the tendency determining unit 28 may count the number of times of appearances of the tag information by using the number of the images to which the tag information is assigned for each kind of the tag information, and may determine that the first user has the hobby related to the tag information of which the number of times of appearances of the tag information counted by using the number of images is equal to or greater than the threshold value.

For example, the hobby of the first user may be to travel abroad only once a year. Accordingly, it is possible to determine whether or not the hobby of the first user is even a hobby related to the tag information of which the number of times of appearances is less by counting the number of times of appearances of the tag information by using the number of the images to which the tag information is assigned, and it is possible to determine that the first user has this hobby.

Subsequently, the hobby of the first user is determined based on the scene tag information.

In this case, the scene detecting unit 30 detects the scene of the image based on the attribute information and the tag information of the image for each image included in the image set (S13).

Subsequently, the tag information assigning unit 26 assigns, as the tag information to the image, the scene tag information related to the scene of the image for each image included in the image set (S14). The scene tag information may be or may not be assigned to the image.

Subsequently, the tendency determining unit 28 counts the number of times of appearances of the scene tag information by using the number of imaging days of the images to which the scene tag information is assigned for each kind of the scene tag information (S15). Subsequently, the tendency determining unit 28 determines that the first user has the hobby related to the scene tag information of which the ratio of the number of times of appearances of the scene tag information counted by using the number of imaging days to the total number of times of appearances of all the kinds of scene tag information items assigned to the images included in the image set is equal to or greater than the threshold value (S16).

In a case where the hobby such as "travel" and "listening to music" of the first user does not directly appear in the image, that is, in a case where it is difficult to determine the hobby of the first user from only the tag information related to the subject, the tendency determining unit 28 determines that the first user has the hobby related to the scene tag information corresponding to the kind of which the number of times of appearances is relatively large among all the kinds of scene tag information items assigned to the images included in the image set owned by the first user.

Alternatively, the tendency determining unit 28 may count the number of times of appearances of the scene tag information by using the number of the images to which the scene tag information is assigned for each kind of the scene tag information, and may determine that the first user has the hobby related to the scene tag information of which the number of times of appearances of the scene tag information counted by using the number of images is equal to or greater than the threshold value.

Subsequently, the hobby of the first user is determined based on the event tag information.

In this case, the group extracting unit 32 extracts the image group from the image set based on the imaging date and time of each image (S17).

Subsequently, the event determining unit 34 determines the event occurring in the image group based on the attribute information and the tag information of the image included in the image group for each image group extracted from the image set (S18).

Subsequently, the tag information assigning unit 26 feeds, as the tag information, the event tag information related to the event back to and assigns to the event and each image which is included in the image group and is captured in the event for each event occurring in the image group extracted from the image set (S19). The number of event tag information items assigned to the image group is not limited to one. Two or more event tag information items may be assigned to the image group, or one event tag information item may not be assigned to the image group.

Subsequently, the tendency determining unit 28 counts the number of times of appearances of the event tag information by using the number of imaging days of the images to which the event tag information is assigned or the number of the events to which the event tag information is assigned for each kind of event tag information (S20). Subsequently, the tendency determining unit 28 determines that the first user has the hobby related to the event tag information of which the ratio of the number of times of appearances of the event tag information counted by using the number of imaging days or the number of events to the total number of times of appearances of all the kinds of event tag information items assigned to the images included in the image set is equal to or greater than a threshold value (S21).

Similarly, in a case where the hobby of the first user does not directly appear in the image, the tendency determining unit 28 determines that the first user has the hobby related to the event tag information of which the number of times of appearances is relatively large among all the kinds of event tag information items assigned to the images included in the image set owned by the first user.

Alternatively, the tendency determining unit 28 may count the number of times of appearances of the event tag information by using the number of the images to which the event tag information is assigned for each kind of the event tag information, and may determine that the first user has the hobby related to the event tag information of which the number of times of appearances of the event tag information counted by using the number of images is equal to or greater than the threshold value.

As stated above, it is possible to accurately determine the hobby of the first user even though the hobby of the first user does not directly appear in the image by determining the hobby of the first user by using the scene tag information and the event tag information.

The tendency determining unit 28 may not determine the tendency of the imaging content in the image set owned by the first user, and may determine a tendency of an imaging content in the image group selected from the image set according to the command to select the image from the image set, such as an image captured in 2018 or an image captured in 2017. Accordingly, a period is divided, and thus, it is possible to determine tendencies of imaging contents such as tendencies of a past imaging content and a current imaging content.

Figure 5:
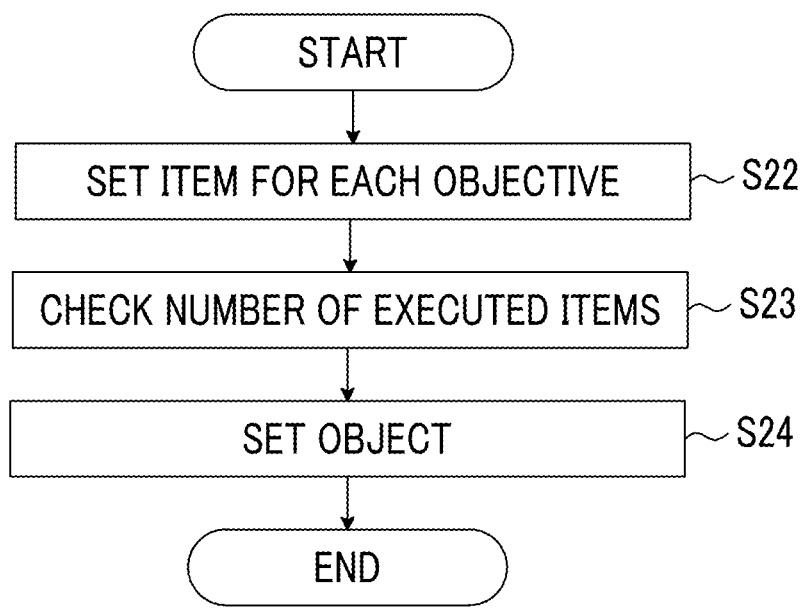
FIG. 5 is a flowchart of an embodiment showing an operation of the image processing system in a case where an objective is set.

Next, an operation of the image processing system 10 in a case where the objective is set will be described with reference to a flowchart shown in FIG. 5.

For example, the objective setting unit 36 can set one or more objectives among a plurality of objectives prepared in advance.

In this case, the objective setting unit 36 sets one or more items to be executed by the first user for each of the plurality of objectives based on the analyzing result (S22).

Subsequently, in a case where the image receiving unit 20 receives an input of the new image or image set owned by the first user and adds the new image or image set to the image set owned by the first user, whenever the new image or image set is added to the image set owned by the first user, the item number determining unit 42 confirms the number of executed items executed by the first user among one or more items set for the objective for each objective, and determines whether or not the number of executed items reaches a threshold value of the objective (S23).

Subsequently, the objective setting unit 36 sets, as one or more objective, the objectives in which the number of executed items reaches the threshold value among the plurality of objectives (S24).

For example, in a case where 30 items are set for one objective and all the items are the execution candidate items, the first user is likely to hesitate to challenge the items with the start from scratch. In contrast, in a case where 10 items are the already executed items and only the 20 remaining items are the execution candidate items, since the first user does not start from scratch, the first user more easily starts to challenge the items than in a case where all the 30 items are the execution candidate items.

The objective setting unit 36 can set one or more objectives based on the tendencies of the imaging contents in the image sets owned by the plurality of users who use the image processing system 10, that is, the client 14. Accordingly, the objectives which are of interest to the plurality of users who uses the image processing system 10, that is, which are popular among the plurality of users can be suggested to the first user.

The objective setting unit 36 can set one or more objectives based on the tendency of the imaging content in one or more images which are shared with other users who use the image processing system 10 among the image included in the image set owned by the first user.

In a case where the images are shared, the image sharing unit 44 shares the images between the first user and the second user. It is considered that the images which are shared with the second user among the images included in the image set owned by the first user are images of interest to the first user. Accordingly, the objective is set based on the images shared with the second user, and thus, it is possible to suggest the objective of interest to the first user.

The objective setting unit 36 may rank the objective according to a degree of achievement of the objective for each of one or more objectives. For example, the objective can be ranked as a bronze rank in a case where a degree of achievement of the objective is 50% or more and is less than 70%, can be ranked as a silver rank in a case where a degree of achievement of the objective is 70% or more and is less than 90%, and can be ranked as a gold rank in a case where a degree of achievement of the objective is 90% or more and is less than 100%. Alternatively, the objective may be ranked as national ranking according to the degree of achievement of the objective.

Next, a method of displaying the objective using the display controller 38 will be described.

The display controller 38 can display description of the objective, a degree of achievement of the objective, and a background image related to the objective for each of one or more objectives.

In this case, for example, under the control of the display controller 38, among one or more items set for the objective, description of the executed item executed by the first user is displayed as the description of the objective, and a degree of execution of the executed item is displayed as the degree of achievement of the objective. The number of executed items, or a ratio of the number of executed items to the number of items set for the objective is displayed as the degree of execution of the executed item.

Alternatively, under the control of the display controller 38, among one or more items set for the objective, description of the execution candidate item which has not been executed by the first user is displayed as the description of the objective, and a degree of execution of the execution candidate item is displayed as the degree of achievement of the objective. The number of execution candidate items or a ratio of the number of execution candidate items to the number of items set for the objective is displayed as the degree of execution of the execution candidate item.

The objective setting unit 36 may exclude the objective which is displayed by a predetermined number of times and is not selected from one or more objectives.

Meanwhile, in a case where the image receiving unit 20 receives the input of the new image or image set owned by the first user and adds the new image or image set to the image set owned by the first user and the new image or image set is the image captured at the location of any item set for the objective excluded from one or more objectives, the objective setting unit 36 may set, as one or more objectives, the objective excluded from one or more objectives again.

For example, in a case where the objective setting unit 36 sets two or more items for one objective, only one item of two or more items may be displayed on the display 48 and the remaining items may be sequentially displayed on the display 48 under the control of the display controller 38. In this case, a feeling of expectation of "looking forward to which item will come out next" can be given to the first user. In a case where two or more objectives are set by the objective setting unit 36, only one objective of two or more objectives may be displayed on the display 48 and the remaining objectives may be sequentially displayed on the display 48 under the control of the display controller 38. In this case, a feeling of expectation of "looking forward to which objective will come out next" can be given to the first user.

The display controller 38 can display an in-challenge objective list being challenged by the first user and a list of items achieved by the first user according to the command to display the list of the objectives.

Hereinafter, an operation of the image processing system 10 will be described in detail by using an example of the client 14 realized by a smartphone or a program operating on the smartphone.

Figure 6:
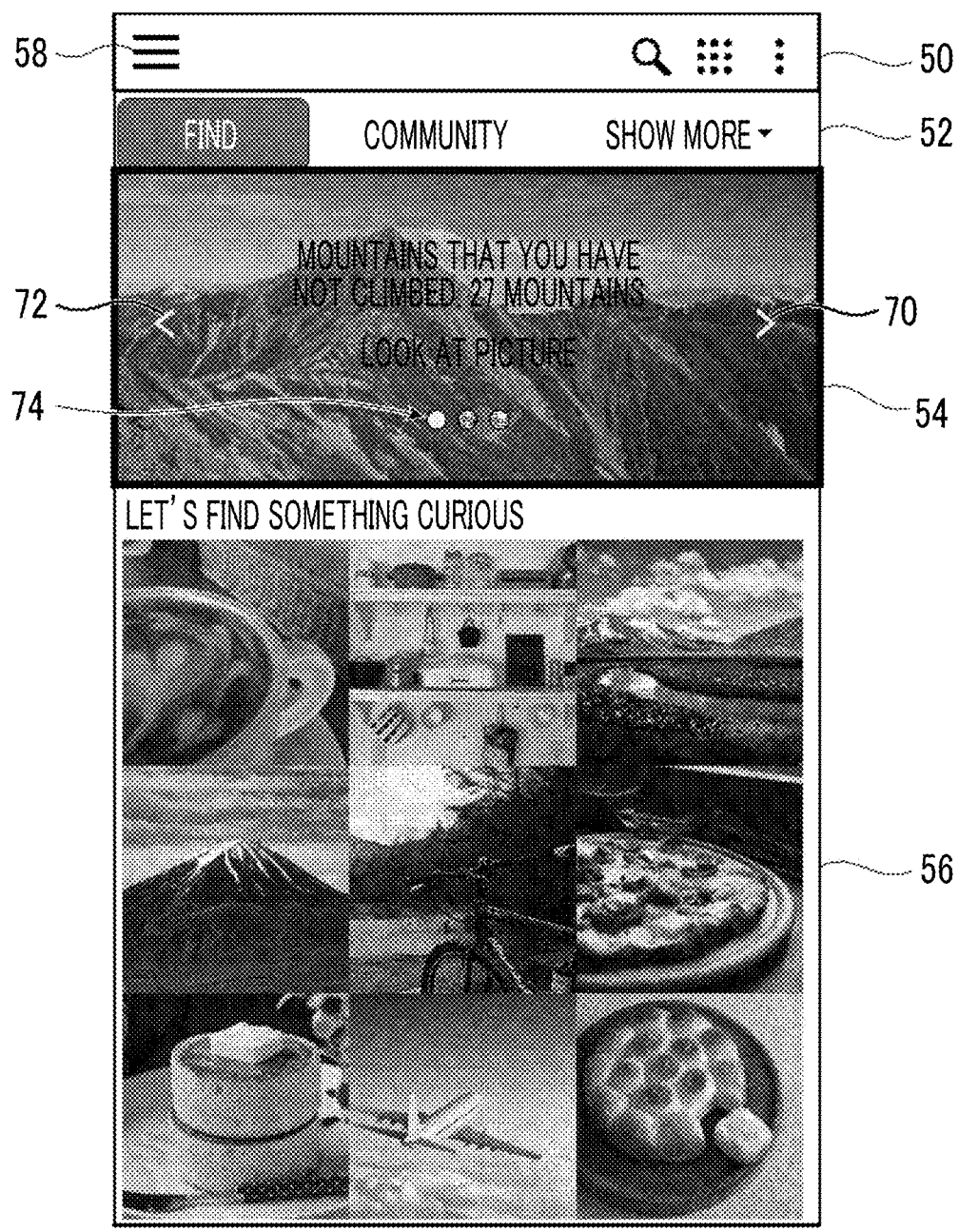
FIG. 6 is a conceptual diagram of an embodiment showing a top-level screen displayed by a program operating on a smartphone.

FIG. 6 is a conceptual diagram of an embodiment showing a top-level screen displayed by the program operation on the smartphone. A menu bar 50 is displayed at an upper portion of the top-level screen shown in FIG. 6, and a tab bar 52 is displayed under a display region of the menu bar 50. An objective 54 set by the objective setting unit 36 is displayed as a banner under a display region of the tab bar 52, and reduced images 56 are displayed as a list under a display region of the objective 54.

On the top-level screen, a menu link button 58 is initially displayed on a left side within the display region of the menu bar 50. In a case where the first user taps the menu link button 58, the highest-hierarchy menu list screen is displayed.

Figure 7:
FIG. 7 is a conceptual diagram of an embodiment showing a highest-hierarchy menu list screen.

FIG. 7 is a conceptual diagram of an embodiment showing the highest-hierarchy menu list screen. For example, menu item buttons such as a photo/video list screen link button 60, an album list screen link button 62, and a stamp rally objective list screen link button 64 are displayed on the highest-hierarchy menu list screen shown in FIG. 7. For example, in a case where the first user taps the stamp rally objective list screen link button 64, a list display screen of stamp rally objectives is displayed.

Figure 8:
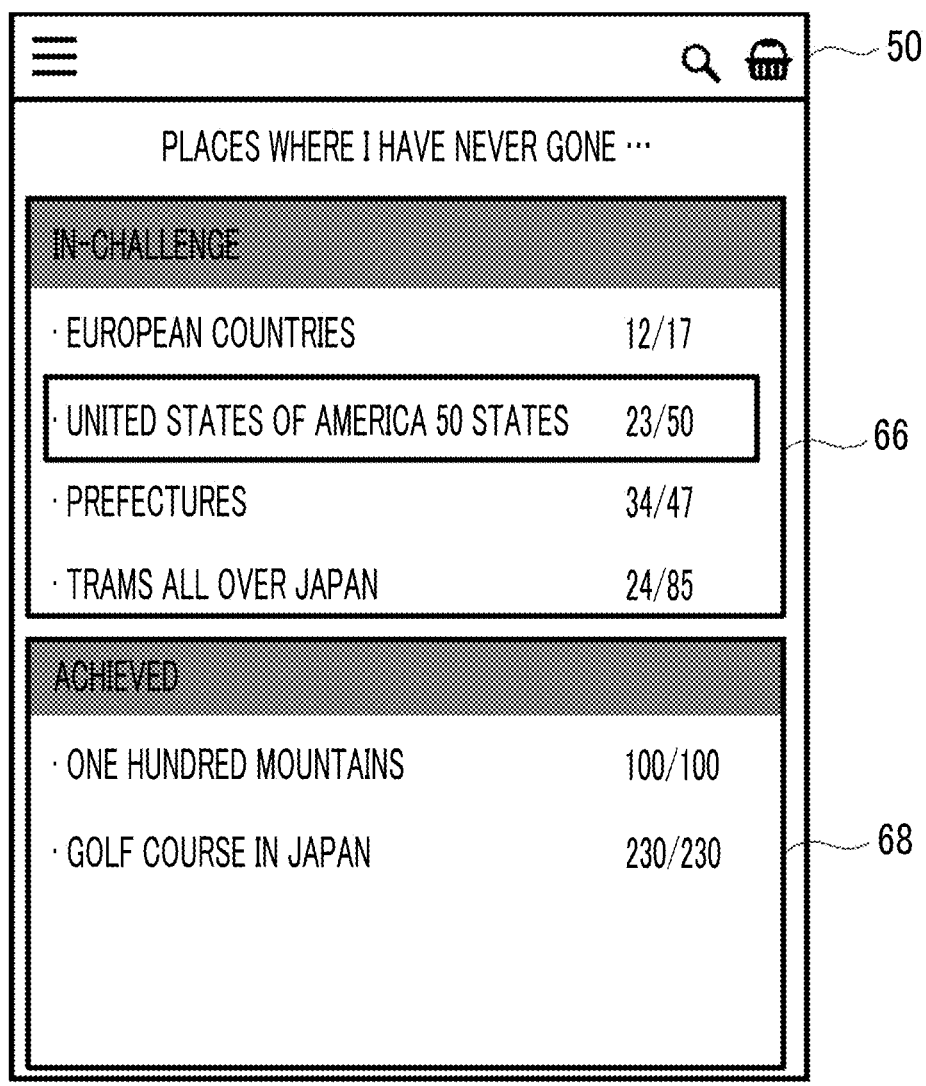
FIG. 8 is a conceptual diagram of an embodiment of a list display screen of objectives of a stamp rally.

FIG. 8 is a conceptual diagram of an embodiment showing a list display screen of the stamp rally objectives. The menu bar 50 is displayed at an upper portion of the list display screen of the stamp rally objectives shown in FIG. 8, and an in-challenge objective list 66 being challenged by the first user is displayed under the display region of the menu bar 50. An objective list 68 achieved by the first user is displayed under a display region of the in-challenge objective list 66.

The object list that the first user has browsed a display screen of objectives to be described below even once is displayed in the display region of the in-challenge objective list 66. For example, an objective of "the United States of America" is to go to states of the United States of America that the first user has not gone to, and items thereof are the states of the United States of America. "23/50" indicates that the first user has already gone to 23 states of 50 states of the United States of America.

In a case where the first user swipes the objective from the right side to the left side in the display region of the in-challenge objective list 66, a button for hiding the objective is displayed. Subsequently, in a case where the first user taps the button for hiding the objective, the objective is hidden.

The objective list in which all the set items have been executed by the first user is displayed in a display region of the achieved objective list 68. For example, an objective of "one hundred mountains" is to go to 100 famous mountains that the first user has not gone, and items thereof are famous mountains. "100/100" indicates that the first user has gone to 100 out of 100 mountains, that is, to all the set famous mountains.

The first user taps the objective in the display region of the in-challenge objective list 66 and the achieved objective list 68 shown in FIG. 8, and thus, the display screen of the objective is displayed.

Subsequently, buttons of "find", "community", and "show more" from the left side to the right side are displayed in the display region of the tab bar 52 shown in FIG. 6. For example, in a case where the first user taps the button of "find", the top-level screen is displayed.

Subsequently, in a central portion of a display region of the objective 54, "mountains that you have not climbed" is displayed as the description of the displayed objective, and "27 mountains" is displayed as the degree of achievement thereof. In this case, the objective is to climb the mounts that the first user has not climbed, and items thereof are mountains. "27 mountains" indicates that there are 27 mountains that the first user has not climbed. A mountain image is displayed as a background image related to the displayed objective in the display region of the objective 54.

A right arrow 70 and a left arrow 72 are respectively displayed at central portions on right and left sides of the display region of the objective 54. An indicator 74 indicating a total objective number and an order (page position) of the displayed objective in the total objective number is displayed at a central portion on a lower side of the display region of the objective. In the case of the example of FIG. 6, the total objective number is three, and the order of the displayed objective in the total objective number is the first (first page).

In the case of the present embodiment, in a case where the first user taps the right arrow 70 in the display region of the objective 54 or swipes the display region of the objective 54 from the right side to the left side, an objective next to the displayed objective is displayed in the display region of the objective 54. In this case, the order of the displayed objective in the total objective number is moved to the right side by one in the indicator 74 if possible. Meanwhile, in a case where the first user taps the left arrow 72 in the display region of the objective 54 or swipes the display region of the objective 54 from the left side to the right side, an objective ahead of the displayed objective is displayed in the display region of the objective 54. In this case, the position of the displayed objective in the total objective number is moved to the left side by one in the indicator 74 if possible.

As stated above, the display controller 38 can sequentially display, as a banner, one or more objectives. One or more objectives may not be manually displayed by the first user, and may be displayed while being sequentially switched whenever a predetermined time elapses.

In a case where the first user taps a portion other than the right arrow 70 and the left arrow 72 within the display region of the objective 54, the display screen of the objective is displayed.

Figure 9:
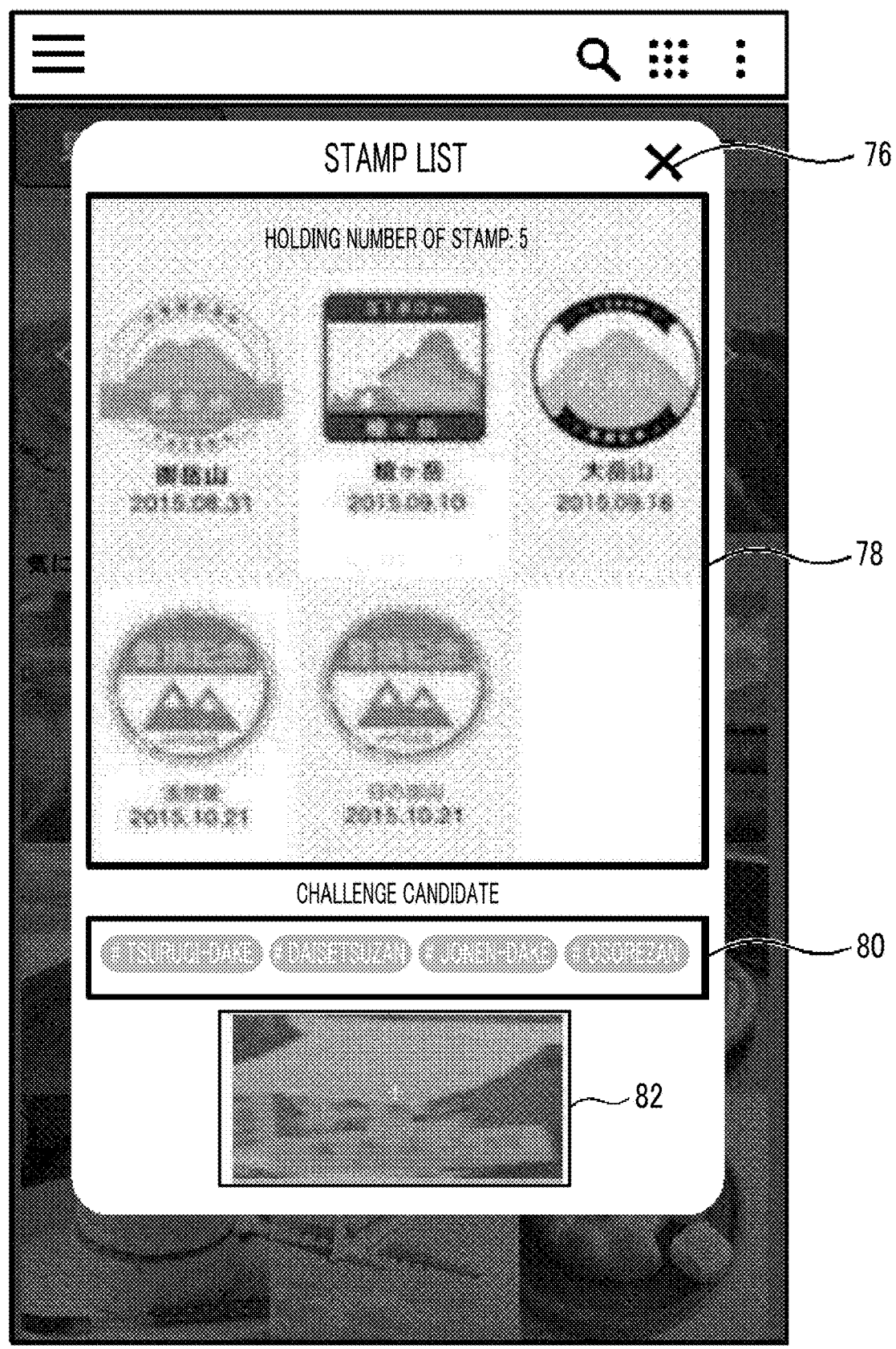
FIG. 9 is a conceptual diagram of an embodiment showing a display screen of the objectives.

FIG. 9 is a conceptual diagram of an embodiment showing the display screen of the objective. In the case of the present embodiment, the display screen of the objective is displayed in a window format. A window close button 76 is displayed at an upper portion of the display screen of the objective shown in FIG. 9. Among one or more items set for the displayed objective, executed items 78 which have been executed by the first user are displayed under the display region of the close button 76 and execution candidate items 80 which have not been executed by the first user are displayed under the display region of the executed items 78. A check-in button 82 is displayed under the display region of the execution candidate items 80.

In the case of the example of FIG. 9, stamps of five mountains that the first user has already climbed are displayed as a list in the display region of the executed items 78. In a case where the number of executed items is large and all the executed items are not able to be displayed as a list in the display region of the executed items 78, for example, the first user vertically swipes the display region of the executed items 78, and thus, it is possible to display the executed items which are not displayed within the display region of the executed items 78.

Tag buttons of four mountains that the first user has not climbed are displayed as a list in the display region of the execution candidate items 80. In a case where the number of execution candidate items is large and all the execution candidate items are not able to be displayed as a list in the display region of the execution candidate items 80, for example, the first user horizontally swipes the display region of the execution candidate items 80, and thus, it is possible to display the execution candidate items which are not displayed within the display region of the execution candidate items 80.

In a case where the first user taps the tag button of the execution candidate item 80, for example, an image assigned a tag is searched for from the images published by the users who use the image processing system 10 and the images published on the Internet, and is displayed within the display region of the check-in button 82. For example, in a case where the first user taps a tag button of "Mount Tsurugi", an image of "Mount Tsurugi" is displayed.

In a case where the first user taps the check-in button 82, a check-in screen is displayed.

Meanwhile, in a case where the first user taps the close button 76, a window of the display screen of the objective is closed, and the screen is returned to a screen before the display screen of the objective is displayed.

Figure 10:
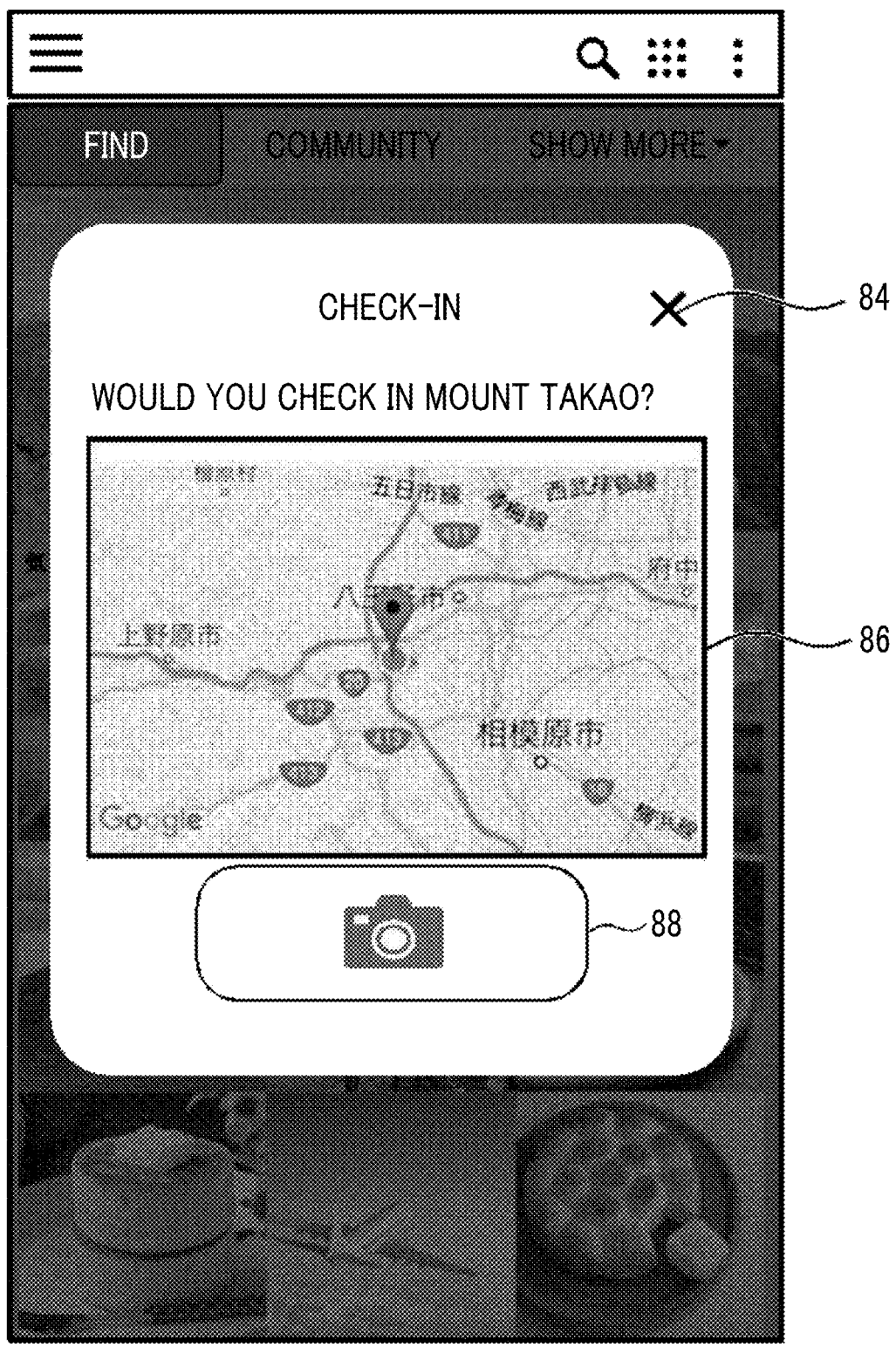
FIG. 10 is a conceptual diagram of an embodiment showing a check-in screen.

FIG. 10 is a conceptual diagram of an embodiment showing the check-in screen. In the case of the present embodiment, the check-in screen is displayed in a window format. The window close button 84 is displayed at an upper portion of the check-in screen shown in FIG. 10. A map 86 of the location of the execution candidate item is displayed under a display region of the close button 84. In the case of the example of FIG. 10, a map of "Mount Takao" is displayed, and a pin mark is displayed at the current location. An imaging button 88 is displayed under a display region of the map 86.

In a case where the first user taps the imaging button 88, a camera (not shown) included in the smartphone is activated. In a case where the first user captures an image, the information of the imaging location is automatically assigned to the captured image by using a global positioning system (GPS) function of the smartphone or reading a position of a radio base station with which the smartphone communicates (all not shown). The captured image is stored in the storage device of the client 14. The captured image is uploaded to the server 12 from the client 14 via the network 16, and is stored in the storage device of the server 12.

In a case where the information of the imaging location assigned to the captured image is confirmed and it is confirmed that the captured image is "Mount Takao", the first user can check in "Mount Takao", and it is determined that the first user has executed the first execution candidate item.

Meanwhile, in a case where the first user taps the close button 84, the widow of the check-in screen is closed, and the screen is returned to the screen before the check-in screen is displayed.

Subsequently, the images, among the images published by the users who use the image processing system 10 and the images published on the Internet, which may be of interest to the first user are displayed as a list in the display region of the reduced image shown in FIG. 6. In a case where the first user taps one reduced image among the reduced images displayed as the list, a detail display screen of an image corresponding to the reduced image is displayed.

In the image processing system 10, it is possible to suggest the objective and the item of interest to the first user to the first user by setting the objective to be achieved by the first user based on the tendency of the imaging content in the image set owned by the first user, setting the item to be executed by the first user based on the analyzing result of each image, and displaying the set objective and the set item on the display. Accordingly, it is possible to provide a good opportunity to capture a new photo to the first user.

The image processing device according to the embodiment of the present invention may not be realized by only the client 14. The server 12 may comprise one or more components of a plurality of components of the client 14.

In the device according to the embodiment of the present invention, a hardware configuration of a processing unit that performs various processing of the command obtaining unit 18, the image receiving unit 20, the attribute information obtaining unit 22, the image analyzing unit 24, the tag information assigning unit 26, the tendency determining unit 28, the scene detecting unit 30, the group extracting unit 32, the event determining unit 34, the objective setting unit 36, the display controller 38, the execution determining unit 40, the item number determining unit 42, the image sharing unit 44, and the communication unit 46 may be dedicated hardware, or may be various processors or computers that execute programs.

Various processors include a central processing unit (CPU) which is a general purpose processor functioning as various processing units by executing software (program), a programmable logic device (PLD) which is a processor capable of changing a circuit configuration after a field programmable gate array (FPGA) is manufactured, and a dedicated electric circuit which is a processor having a circuit configuration designed as a dedicated circuit in order to perform specific processing such as application specific integrated circuit (ASIC).

One processing unit may be constituted by one of the various processors. One processing unit may be obtained by combining the same kind or different kinds of two or more processors, for example, by combining a plurality of FPGAs, or may be obtained by combining the FPGA and the CPU. The plurality of processing units may be constituted by one of the various processors or may be constituted by using one processor obtained by combining two or more of the plurality of processing units.

For example, one processor is constituted by combining one or more CPUs and software so as to be represented by the computers such as the server and the client, and this processor functions as the plurality of processing units. A processor that realizes the functions of the entire system including the plurality of processing units by using one integrated circuit (IC) chip is used so as to be represented by a system on chip (SoC).

More specifically, the hardware configuration of these various processors is an electric circuitry obtained by combining circuit elements such as semiconductor elements.

For example, a method according to the embodiment of the present invention can be implemented by a program causing a computer to execute steps. It is possible to provide a computer-readable recording medium having the program recorded thereon.

While the present invention has been described in detail, the present invention is not limited to the embodiment, and may be modified and change in various manners without departing the gist of the present invention.

EXPLANATION OF REFERENCES

10: image processing system
12: server
14: client
16: network
18: command obtaining unit
20: image receiving unit
22: attribute information obtaining unit
24: image analyzing unit
26: tag information assigning unit
28: tendency determining unit
30: scene detecting unit
32: group extracting unit
34: event determining unit
36: objective setting unit
38: display controller
40: execution determining unit
42: item number determining unit
44: image sharing unit
46: communication unit
48: display
50: menu bar
52: tab bar
54: objective
56: reduced image
58: menu link button
60: photo/video list screen link button
62: button of album list screen link
64: button of stamp rally objective list screen link
66: in-challenge objective list
68: list of achieved objectives
70: right arrow
72: left arrow
74: indicator
76, 84: close button
78: executed item
80: execution candidate item
82: check-in button
86: map
88: imaging button

What is claimed is:

1. An image processing device comprising a processor connected to a memory, the processor configured to:
   receive an input of an image set owned by a user;
   analyze each image included in the image set;
   determine a plurality of tag information of an imaging content in the image set based on an analyzing result of each image;
   set one or more objectives to be achieved by the user based on the plurality of tag information, and set one or more items to be executed by the user for each of the one or more objectives based on the analyzing result of each image;
   perform control such that at least one of the one or more objectives or the one or more items is displayed on a display; and
   display a description of the objective, a degree of achievement of the objective, and a background image related to the objective for each of the one or more objectives.

2. The image processing device according to claim 1, wherein
   the plurality of tag information includes a scene tag information or an event tag information.

3. The image processing device according to claim 1, wherein, in a case where a first objective is selected from the one or more objectives, the processor displays executed items which have been executed by the user and execution candidate items which have not been executed by the user, among one or more items set for the first objective.

4. The image processing device according to claim 3, the processor further configured to:
   determine whether or not the user has executed the execution candidate items, wherein the processor determines that the user has executed a first execution candidate item, in a case where the first execution candidate item is selected from the execution candidate items and an image captured by the user is captured in a location of the first execution candidate item based on information of an imaging location assigned to the image captured by the user is confirmed, and/or in case where the image captured by the user is input, and the user checks in the location of the first execution candidate item is confirmed.

5. The image processing device according to claim 1, wherein the processor sets the one or more objectives from a plurality of objectives prepared in advance.

6. The image processing device according to claim 5, wherein the processor sets one or more items to be executed by the user based on the analyzing result of each image for each of the plurality of objectives, the processor further configured to confirm the number of executed items executed by the user among the one or more items set for the objective for each objective whenever the new image or image set is added to the image set owned by the user, and determine whether or not the number of executed items reaches a threshold value of the objective, in a case where the processor receives an input of a new image or image set owned by the user and adds the received new image or image set to the image set owned by the user, and the processor sets, as the one or more objectives, the objective of which the number of executed items reaches the threshold value among the plurality of objectives.

7. The image processing device according to claim 6, wherein the processor confirms the number of executed items executed by the user among the one or more items set for the objective for each objective whenever the new image or image set is added to the image set owned by the user based on the plurality of tag information of the new image or image set.

8. The image processing device according to claim 1, wherein the processor sets the one or more objectives based on tendencies of imaging contents in image sets owned by a plurality of users who uses the image processing device.

9. The image processing device according to claim 1, wherein the processor sets the one or more objectives based on a tendency of an imaging content in one or more images shared with other users who use the image processing device among the images included in the image set owned by the user.

10. The image processing device according to claim 1, wherein the processor sequentially displays the one or more objectives as a banner.

11. The image processing device according to claim 1, wherein the processor displays, as the description of the objective, description of the executed item executed by the user among the one or more items set for the objective, and displays a degree of execution of the executed item as the degree of achievement of the objective.

12. The image processing device according to claim 11, wherein the processor displays, as the degree of execution of the executed item, the number of executed items or a ratio of the number of executed items to the number of items set for the objective.

13. The image processing device according to claim 12, wherein the processor displays, as the description of the objective, description of an execution candidate item which has not been executed by the user among the one or more items set for the objective, and displays, as the degree of achievement of the objective, a degree of execution of the execution candidate item.

14. The image processing device according to claim 13, wherein the processor displays, as the degree of execution of the execution candidate item, the number of execution candidate items or a ratio of the number of execution candidate items to the number of items set for the objective.

15. The image processing device according to claim 1, wherein the processor excludes the objective which is displayed by a predetermined number of times and is not selected from the one or more objectives.

16. The image processing device according to claim 15, wherein, in a case where the processor receives an input of a new image or image set owned by the user and adds the new image or image set to the image set owned by the user and the new image or image set is an image captured in a location of any item set for the objective excluded from the one or more objectives, the processor sets, as the one or more objectives, the objective excluded from the one or more objectives.

17. The image processing device according to claim 1, wherein the processor determines a tendency of an imaging content in an image group selected from the image set.

18. The image processing device according to claim 1, wherein the processor displays a list of objectives being challenged by the user and a list of objectives achieved by the user.

19. An image processing method comprising:
receiving an input of an image set owned by a user;
analyzing each image included in the image set;
determining a plurality of tag information of an imaging content in the image set based on an analyzing result of each image;
setting one or more objectives to be achieved by the user based on the plurality of tag information of the imaging content, and setting one or more items to be executed by the user for each of the one or more objectives based on the analyzing result of each image;
performing control such that at least one of the one or more objectives or the one or more items is displayed on a display; and
displaying a description of the objective, a degree of achievement of the objective, and a background image related to the objective for each of the one or more objectives.

20. The image processing method according to claim 19, wherein, in a case where a first objective is selected from the one or more objectives, executed items which have been executed by the user and execution candidate items which have not been executed by the user among the one or more items set for the first objective are displayed.

21. The image processing method according to claim 20, further comprising:
determining, by an execution determining unit, whether or not the user has executed the execution candidate item, wherein, determining that the user has executed the first execution candidate item, in a case where a first execution candidate item is selected from the execution candidate items and an image captured by the user is captured in a location of the first execution candidate item based on information of an imaging location assigned to the image captured by the user is confirmed, and/or in case where the image captured by the user is input, and the user checks in the location of the first execution candidate item is confirmed.

22. A non-transitory computer recording medium storing a program causing a computer to execute the steps of the image processing method according to claim 19.

23. An image processing device comprising a processor connected to a memory, the processor configured to:
receive an input of an image set owned by a user;
analyze each image included in the image set;
determine a plurality of tag information of an imaging content in the image set based on an analyzing result of each image;
set one or more objectives to be achieved by the user based on the plurality of tag information, and set one or more items to be executed by the user for each of the one or more objectives based on the analyzing result of each image;
perform control such that at least one of the one or more objectives or the one or more items based on degree of achievement of the objective is displayed on a display; and
rank the objective according to the degree of achievement of the objective for each of the one or more objectives.

24. An image processing method comprising:
receiving an input of an image set owned by a user;
analyzing each image included in the image set;
determining a plurality of tag information of an imaging content in the image set based on an analyzing result of each image;
setting one or more objectives to be achieved by the user based on the plurality of tag information of the imaging content, and setting one or more items to be executed by the user for each of the one or more objectives based on the analyzing result of each image;
performing control such that at least one of the one or more objectives or the one or more items based on degree of achievement of the objective is displayed on a display; and
ranking the objective according to the degree of achievement of the objective for each of the one or more objectives.

* * * * *